United States Patent
Brewer et al.

(10) Patent No.: US 9,287,706 B2
(45) Date of Patent: Mar. 15, 2016

(54) INTELLIGENT POWER STRIP CONNECTING MASTER AND SLAVE PERIPHERAL DEVICE(S) WHEREIN THE MASTER CAN BE DETECTED WHEN CONNECTED TO ANY OUTLET OF THE POWER STRIP

(71) Applicant: International Business Machines Corporation, Armonk, NY (US)

(72) Inventors: Derek Ryan Brewer, Independence, OH (US); Kerry Michael Langford, Rochester, MN (US); Robert Dale Wilhelm, Cheyenne, WY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 19 days.

(21) Appl. No.: 14/081,324

(22) Filed: Nov. 15, 2013

(65) Prior Publication Data

US 2014/0327311 A1    Nov. 6, 2014

Related U.S. Application Data

(63) Continuation of application No. 13/874,980, filed on May 1, 2013, now abandoned.

(51) Int. Cl.
  *G06F 13/00* (2006.01)
  *H02J 3/00* (2006.01)
  *G06F 1/26* (2006.01)
  *G06F 13/38* (2006.01)

(52) U.S. Cl.
  CPC . *H02J 3/00* (2013.01); *G06F 1/266* (2013.01); *G06F 13/385* (2013.01); *Y10T 307/469* (2015.04)

(58) Field of Classification Search
  CPC ................................ G06F 3/0231; H02J 3/00
  USPC ................. 713/1, 2, 300; 710/14–19; 307/39
  See application file for complete search history.

(56) References Cited

U.S. PATENT DOCUMENTS

| | | | |
|---|---|---|---|
| 5,737,616 A * | 4/1998 | Watanabe | 713/340 |
| 6,243,821 B1 * | 6/2001 | Reneris | 713/323 |
| 6,586,849 B2 | 7/2003 | Tarr | |
| 6,975,947 B2 * | 12/2005 | Oh | 702/60 |
| 7,791,864 B2 | 9/2010 | Matyas | |
| 8,106,541 B1 | 1/2012 | Sarullo | |
| 8,271,815 B2 * | 9/2012 | Lin et al. | 713/320 |
| 8,301,271 B2 * | 10/2012 | Lee et al. | 700/18 |
| 2005/0262367 A1 * | 11/2005 | Shih | 713/323 |
| 2009/0100202 A1 | 4/2009 | Keul | |
| 2010/0044195 A1 | 2/2010 | Chiang | |
| 2014/0028097 A1 * | 1/2014 | Augur | 307/39 |
| 2014/0236372 A1 * | 8/2014 | Ewing et al. | 700/295 |
| 2014/0239721 A1 * | 8/2014 | Sgarroni | G04C 23/26 307/38 |

* cited by examiner

*Primary Examiner* — Tammara Peyton
(74) *Attorney, Agent, or Firm* — David A. Mims, Jr.; Damion Josephs; Robert V. Wilder

(57) ABSTRACT

A method and implementing computer system are provided in which a smart power strip is controlled by a master device which is also plugged-into the power strip. In an exemplary implementation, a computer or PC operates as a master device and a direct line of communication from the computer allows the OS to make a decision based on settings whether or not to power on or off individual power outlets on the power strip used in common by the computer and various peripheral devices. Thus, only selected peripheral devices are powered-on along with the computer when the computer or other master device is powered-on at a common power strip.

9 Claims, 4 Drawing Sheets

INTELLIGENT POWER STRIP CONNECTING MASTER AND SLAVE PERIPHERAL DEVICE(S) WHEREIN THE MASTER CAN BE DETECTED WHEN CONNECTED TO ANY OUTLET OF THE POWER STRIP

CROSS REFERENCE TO RELATED APPLICATIONS

This application is a Continuation of and claims priority to co-pending patent application Ser. No 13/874,980, which was filed on May 1, 2013, assigned to the assignee of the present application and included herein by reference. Subject matter disclosed but not claimed herein is disclosed and claimed in the referenced patent application.

FIELD OF THE INVENTION

The present invention relates generally to information processing systems and more particularly to a methodology and implementation for an electrical power strip that can be used in conjunction with a master device so as to allow selected peripheral devices associated with the master device to be powered-on or powered-off depending upon inputs to and applications running on the master device.

BACKGROUND OF THE INVENTION

Power strips exist which are capable of turning the power off completely to eliminate the "phantom" or "vampire" power draw from devices which can occur even when the component is turned off. "Smart" power strips also exist which use a master/peripheral correlation by which if the master is turned off, the peripheral outlets are also turned off. One example of this smarter power strip might describe a TV plugged-into the master outlet and home theater components (DVD player, cable box, home theater receiver, etc) all of which are plugged-into the peripheral outlets of the power strip. When the TV is powered off, which is typically detected by measuring wattage use at the outlet, all of the component devices that are plugged-into the power strip are also powered off to eliminate any power draw. Thus, either all peripheral devices are powered on or they are all powered off. However, when peripheral devices are connected or powered on at the power strip, the "phantom" or "vampire" power draw from those devices can still occur if the component is powered-on at the power strip even when the peripheral, component itself is turned off at the device and not currently used in conjunction with a master device which is turned on, e.g. when a DVD device is used but not a cable box device in conjunction with a powered on TV in a user viewing system.

Thus there is a need for an improved methodology and implementation for eliminating the unintended "phantom" or "vampire" power draw by devices that are turned off at the peripheral device itself but still connected at a common power strip with a turned on master or computer device.

SUMMARY OF THE INVENTION

A method and implementing computer system are provided in which a smart power strip is controlled by a master device which is also plugged-into the power strip. In an exemplary implementation, a computer or PC operates as a master device and a direct line of communication from the computer allows the OS to make a decision based on settings whether or not to power on or off individual power outlets on the power strip used in common, by the computer and various peripheral devices. Thus, only selected peripheral devices are powered-on along with the computer when the computer or other master device is powered-on at a common power strip.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
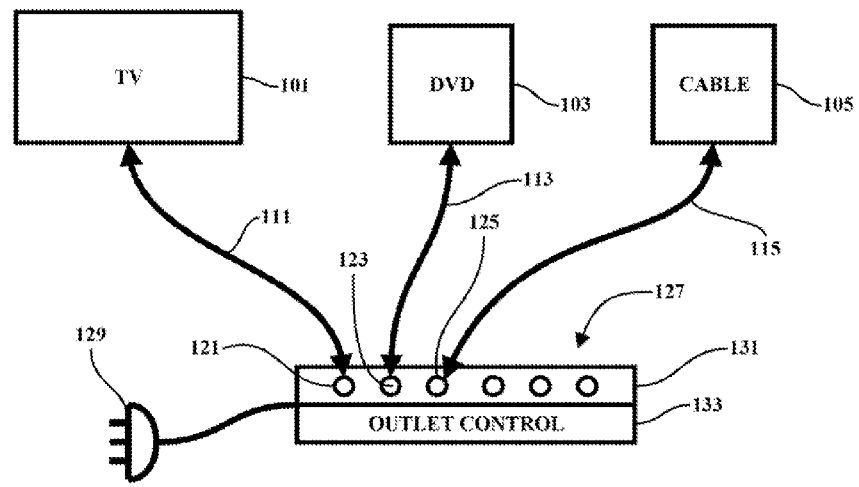
FIG. 1 is an illustration of one embodiment of a system in which the present invention may be implemented.

The various methods discussed herein may be implemented in any system, including a computer system, which includes a master device and one or more peripheral devices or peripheral devices which are designed to operate in conjunction with the master device. Since the individual components of a system which may be used to implement the operating functions used in practicing the present invention are generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention.

The present disclosure extends the idea of the "green"/conserve/intelligent power strip by adding a logic component to a power strip by which a plugged-in component can be identified by the power strip. In one embodiment this could exist simply as manufacturer pre-defined outlets on the power strip into which the user would manually plug components into (DVD player into outlet marked as DVD player, cable box into cable box outlet, etc). In a second embodiment, pluggable components would identify themselves to the intelligent power strip when attached. This requires a system by which the device is manufactured to include a method to identify itself via the power cable and a method for the intelligent power strip to read the identifying information passed to it via the power cable from the component. The final aspect of this scenario is providing a method for a master device (for example, a TV or computer) to query the power strip and determine which device is plugged-into which, outlet as well as the ability for this master device to control the power for each outlet on the intelligent power strip.

The present disclosure describes a dynamic, automated method for providing power only to devices which are determined to be activated by the master device. In a cost-savings or "green" analysis, our solution provides even more savings and less power consumption due to the interface logic enabled between a master device and the power strip device.

In an exemplary implementation, a TV is plugged-in as master device and peripheral devices such as a DVD player, audio receiver with powered subwoofer, and cable box are also plugged-in to a common power strip. The peripheral devices are identified as peripheral devices which may be used in conjunction with the master TV device. When the TV is turned on, the TV determines which component input is active and sends a request to the intelligent power strip to enable power only to the particular outlet into which the appropriate peripheral device is connected. For example, if the TV input is currently set for a cable input, the intelligent power strip turns on the power to the outlet for the cable box but leaves the DVD player outlet disabled and un-powered at the power strip. If the input to the TV is later switched to the DVD player, the TV then sends a power on request to the outlet for the DVD player and also sends a disable power request to the outlet for the cable box.

An example for handling the audio receiver and subwoofer may be implemented with a menu, option available via the TV which allows the user to power on/off the receiver and subwoofer. In the present disclosure, a computer is used as a master device and peripheral devices such as powered speakers, monitor, and printer are used and referred to as peripheral devices. As a feature of the present disclosure, the peripheral devices are controlled via the intelligent power strip as controlled by the computer, and additional logic processing on the computer. For example, if the computer detects there is not an existing audio event (e.g. music or video with sound) then there is no need for the speakers to remain powered on and the computer via communication with the intelligent power strip can disable power to the outlet for the speakers. When an audio event is detected, for example an incoming mall alert, the PC determines if the speaker outlet is powered off. If the speaker system is off, the audio is then queued, the computer sends the command to enable power to the outlet for the speakers, and the sound is played. After a time period during which no further audio events are detected, the computer would then again disable power to the speakers.

With reference to the drawings, in FIG. 1, there is shown an exemplary implementation in which a TV 101 is being operated as a master device and a DVD player 103 and a cable box 105 are connected via connections 111, 113 and 115 as peripheral devices to a common power strip 127 which is arranged to selectively provide power to any of the connected devices. The power strip device 127 includes an outlet section 131 and also a outlet control section 133. The outlet control section 133 further includes control circuitry such as logic, memory and processing units (not shown) which is connected to transmit and received control signals between the power strip 127 and the various devices such as devices 101, 103 and 10 which are connected to the power strip device 127. As shown, the power strip device 127 includes a series of outlets e.g. 121, 123 and 125, into which the three devices 101, 103 and 105 are connected, as well as a power strip plug 129 for receiving power from an outside power source. The power strip device 127 is designed to send information concerning which peripheral devices are plugged-into the power strip as well as device status information of the devices and to selectively apply or not apply power to plugged-in devices 101, 103 and 105 at the power strip device in response to commands received from a master device such as the TV 101. Connections 111, 113 and 115 are designed to deliver power as well as control signals between the power strip 127 and the devices plugged-into the power strip. Alternatively, the control signals may be transmitted and received between the power strip and the plugged-in devices through other separate transmission systems such as RF or LR systems.

Figure 2:
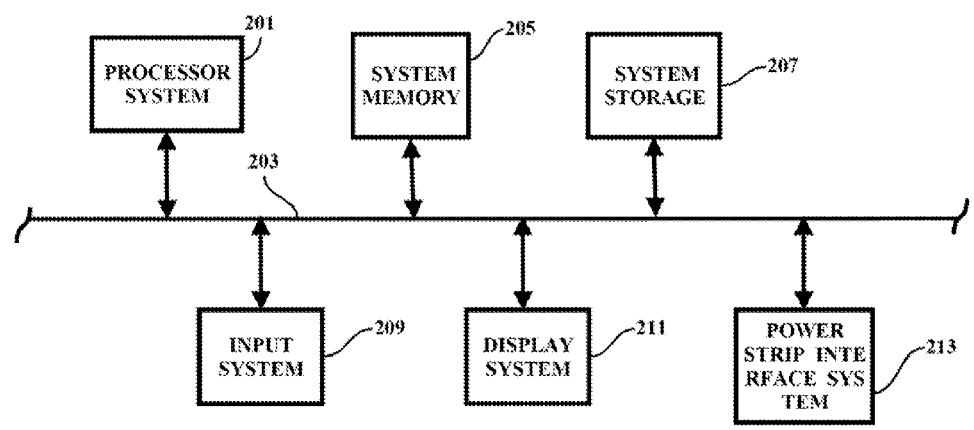
FIG. 2 is a block diagram showing several of the major components of an master device used in conjunction with a power strip as illustrated in FIG. 1.

In FIG. 2, several of the major components of an exemplary master device which may be used in conjunction with a selective or intelligent power strip device and system are illustrated. As shown, a processor system 201 is connected to a main bus 203 which is also connected to a system memory 205, system storage 207, an input system 209, a display system 211 and a power strip interface system 213. The master device main bus is arranged for connection to other systems and circuitry as required for normal operation of the particular master device being used.

Figure 3:
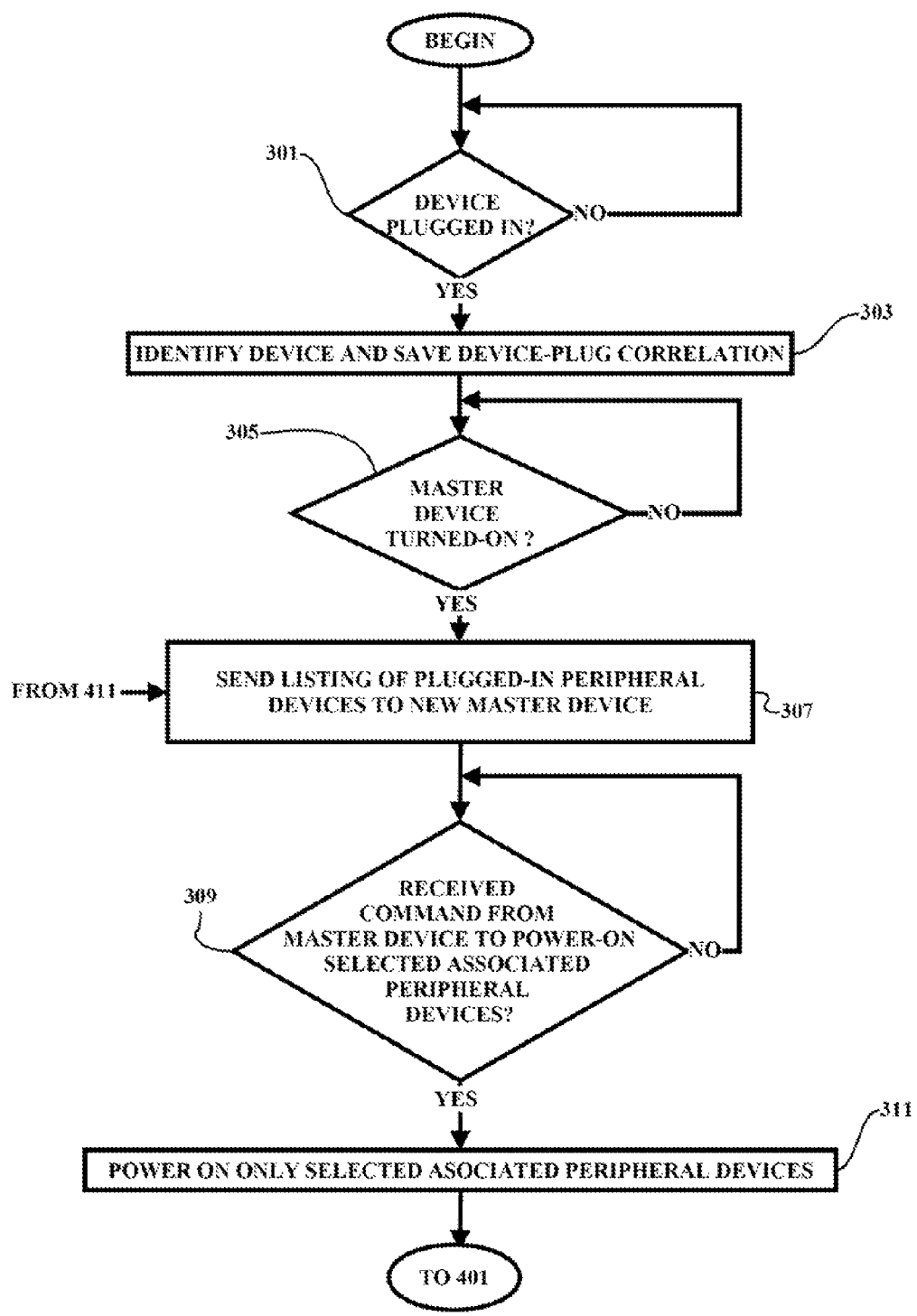
FIG. 3 is a flow chart illustrating an exemplary operation in one embodiment of the power strip device shown in FIG. 1.

FIG. 3 shows an exemplary flow sequence or programming occurring at the power strip device 127 during an exemplary operation. As shown, when a device is plugged 301 into the power strip device 127, the particular device is identified by the power strip, and as additional devices are plugged-in, a correlation table is created and saved 303 to list which devices (e.g. 101-105) are plugged-into which outlets (e.g. 121-125) of power strip 127. In one embodiment, this correlation is accomplished by the device identifying itself to the power strip and the power strip creating the correlation (outlet 121=TV 101, outlet 123=DVD player 103, etc). The correlation would be initiated and verified every time a device is plugged-in or unplugged. In another embodiment the correlation is "hard-coded" into the power strip by identifying the outlet and the device which should be attached to the particular outlet. For example, outlet 123 labeled "DVD" player (e.g. by decal or print on the power strip near the outlet 123) in order that the DVD player be plugged-into that outlet. This list is correlated with the existing inputs available to the controlling device. For example, a TV queries the outlet strip. The outlet strip replies that a DVD player and cable box are currently plugged-in. Now the input signal on the TV can be used to communicate with the power strip in order to intelligently enable and disable power to specific components. When a controlling or master device, i.e. the TV 101 in FIG. 1, is plugged-in, the controlling device 101 communicates with the power strip 127 which receives a request for the list of currently plugged-in devices from the master device. The power strip 127 then sends 307 the plugged-in device listing to the requesting master device 101. The master device 101 then sends a request to power-on only specifically identified peripheral devices and the power strip receives the request 309 and responds by powering-on 311 only the specific peripheral devices identified by the master device 101.

Figure 4:
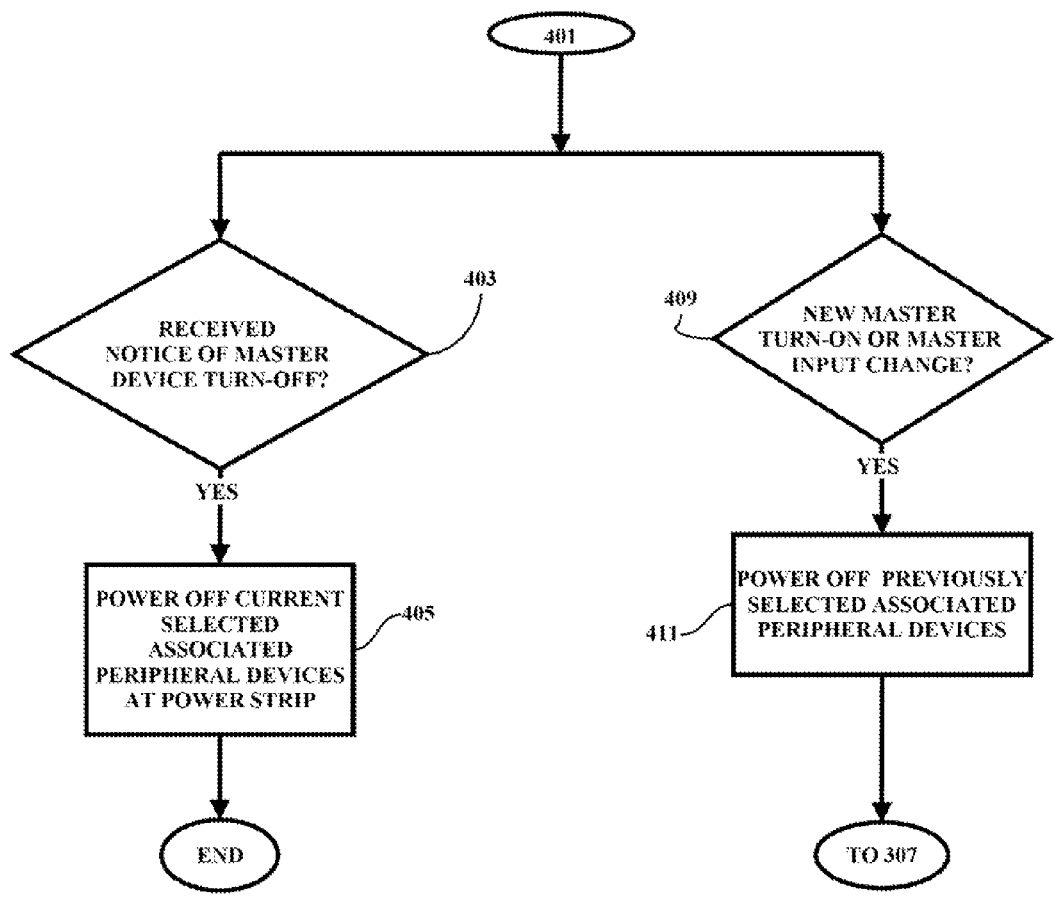
FIG. 4 is a continuation, of the flow chart illustrated in FIG. 3.

In the exemplary flow chart shown in FIG. 4, when the power strip 127 receives notice of a master device turn-off 403, the power strip control circuitry 133 is effective to power-off 405 all associated peripheral devices previously identified by that master device for turn-on. If the power strip receives a notice that a new master device has been turned-on 409, the peripheral devices currently turned-on will be turned-off 411 and the processing will return to block 307 to continue. Similarly, if the power strip receives notice from a master device that the master device input has changed 409, then the peripheral devices currently turned-on will be turned-off 411 and the processing will return to block 307 to continue.

Figure 5:
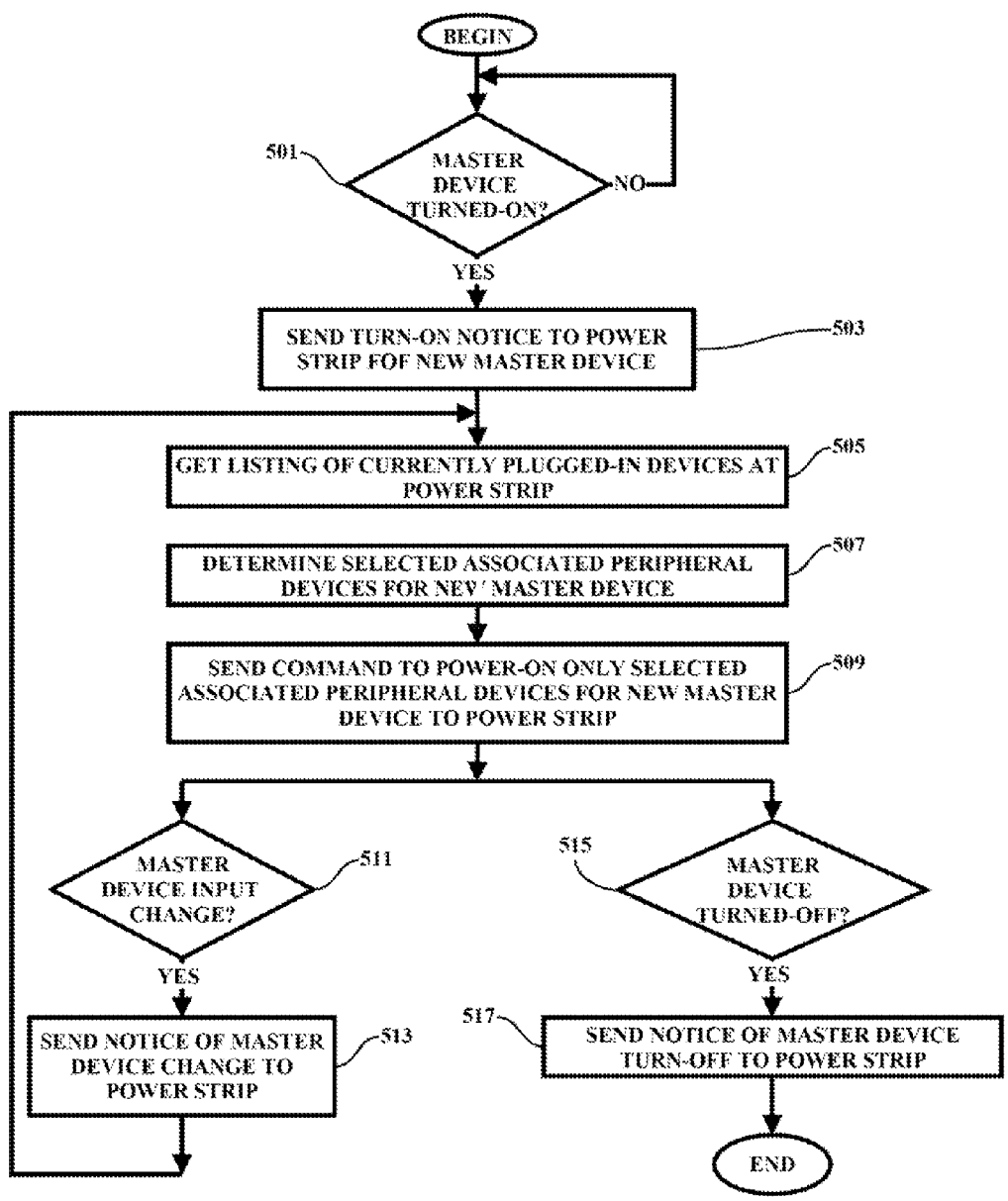
FIG. 5 is a flow chart illustrating an exemplary operation in one embodiment of the TV master device shown in FIG. 1.

FIG. 5 illustrates the flow sequence or programming occurring at the master device during an exemplary operation of the disclosed system. As shown, when a master device is turned on 501, notice is sent 503 to the power strip 127 of the new master device turn-on. The master device then obtains a listing of currently plugged-in devices 505 from the power strip 127. The master device then determines which of the currently plugged-in peripheral devices to power-on 507 and sends a power-on command for only the selected peripheral devices 509 to the power strip 127. When the master device input changes 511, then notice of such change is sent to the power strip outlet control 133 of the power strip 127 (which then turns off current peripheral devices 411) and the process returns to block 505 to continue. When the master device is turned off, then notice of the turn-off is sent to the power strip outlet control 133 of the power strip 127 (which in turn turns off the associated peripheral devices 405), and the processing is ended.

In another embodiment, the power strip includes labels, printing, icons, or other notation denoting the suggested peripheral which should be attached at the respective outlets. For example, individual outlets labeled PC, Monitor, Speakers, Printer, Scanner, and/or any other common peripherals as necessary. Generic labeled outlets for non-specific attachments may also be included.

In an embodiment in which the power strip dynamically determines which devices are attached, the electronic devices plugged into a power strip can communicate data to a processor on the power strip when it is attached. For example, when PC speakers are plugged-into the outlet strip and their power button is turned on, the speakers have a logic component which sends packets of information over the power cord (or other means) to the power strip or USB, i.e. the power strip connection can carry and/or transmit device-identifying information.

In another example, a processor on a power strip creates a table of outlets which includes outlet number, current state of outlet (on/off), and whether the outlet is empty or lists a device plugged-in. This table is saved at the power strip and sent to the master device when requested as noted above. Interaction between PC master and power strip affects the power state of the individual outlets. Different peripheral devices may be associated with different applications. For example, a printer is associated with the print spooler, a scanner is associated with a scanning application, speakers are associated with player applications, as well as general sound playback for operating system and application events. When an application is opened or event occurs, the status of the associated device is queried via the PC master communicating with the power strip. If the required peripheral device is already on and ready, no further action is taken. If, however, the required peripheral device is powered off, the PC master communicates a request to the power strip to enable power for the peripheral. The power strip enables power at only the required outlet. Output which is directed to the peripheral device (a print job, sound event, etc) would ideally be spooled or paused at the PC master until the device is powered and ready.

Determination of readiness of the end device in one example, would comprise direct communication from the peripheral device to the power strip and from the power strip to the PC master device, or it may simply be accomplished by waiting a pre-determined time period. Further, peripheral devices may have power disabled based on a period of inactivity. For example, when an application has been inactive for a period of time, the PC master device determines the associated device and communicates a request to the power strip to disable power to the specific outlet. This action would best be a default for devices with multiple associated applications (speakers, for example) or staggered usage (a printer, for example). If the PC master device will be entering a shutdown/standby mode due to a period of inactivity, the PC master communicates a request to the power strip to disable power to associated peripheral device outlets such as the monitor, speakers, printer, or any other device which relies on the PC.

Peripheral devices may also have power disabled based on application exit. For example, when an application is closed, the PC determines the associated device and communicates a request to the power strip to disable power to the specific outlet. This action would best be a default for devices of one-time/one-session usage such as a scanner.

In another example, power to speakers attached to a master device or master PC and connected to pre-defined outlets on power strip may be selectively enabled and/or disabled. Speakers may be plugged-into a power strip-with-predefined outlets into the outlet labeled "speakers". The predefined outlet labeled as "speakers" corresponds to outlet 3 on the outlet strip in one example. When a user presses the power button on external speakers if required, logic contained within power strip updates the table of plugged-devices to show the row for outlet 3, state=ON, device name="speakers". The power strip ideally senses voltage at individual outlet as well to determine external device power setting, if the user then opens a music player on the PC master, the PC notes association between the music player and speakers with included parameters defining a period of inactivity time to disable power. This could be incorporated into operating system power settings or similar settings as well as similar scenarios for different operating systems. The PC then queries power strip for the power status of "speakers" using power line networking or USB power strip connection and requests that if current state is OFF, initiate power ON. If the power strip responds that speakers are currently ON, then the speakers operate as normal. If the user then presses PAUSE, after pre-determined state of inactivity (because the music player has been paused and no sound events have occurred), the PC master sends a "power-off" message for the device "speakers" to the power strip. The power strip receives the power-off request and correlates the device "speakers" with outlet 3 and disables power to outlet 3. The power strip then updates the table of plugged-devices to show the row for outlet 3, state=OFF, device name="speakers". Later, if the user presses Play, the PC notes association between the player and speakers with included parameters defining a period of inactivity time to disable power. The PC then queries power strip for the power status of "speakers" using power line networking or USB power strip connection and requests that if current state is OFF, initiate power ON. The power strip responds that speakers are currently OFF. The PC quiesces playback and the power strip performs power ON for outlet 3.

The power strip updates table of plugged-devices to show the row for outlet 3, state=ON, device name="speakers". The PC master then waits a few seconds to assume power OK has completed for speakers and the PC master resumes the play function and the speakers operate as normal. After pre-determined state of inactivity/no sound events have occurred, the PC sends a "power-off" message for the device "speakers" to the power strip. The power strip receives the power-off request and correlates the device "speakers" with outlet 3 and disables power to outlet 3. The power strip updates table of plugged-devices to show the row for outlet 3, state=OFF, device, name="speakers".

In another example, power may be enabled and/or disabled to a scanner attached to PC master which is connected to an intelligent power strip. A scanner is attached to a PC master device, and driver software and associated applications have been installed, and association created between scanner identifying itself to the intelligent power strip as a specific scanner plugged-into outlet 5 for example. When a user opens scanning software on the PC master device, the PC notes an association between scanning software and the scanner with included parameters. The PC queries power strip for the power status of "scanner" using power line networking, USB or other device to the power strip connection and requests that if current state is OFF, initiate power ON. The power strip responds that "scanner" is currently OFF. The power strip then performs power-on for outlet 5. The power strip updates table of plugged-devices to show the row for outlet 5, state=ON, device name="scanner". The user then performs scanning actions and exits the scanning application. The PC notes the application exit event and the association with scanner device and sends power OFF request for scanner to the intelligent power strip using power line networking or USB or other connection. The power strip receives the power-off request and correlates the device "scanner" with outlet 5 and disables power to outlet 5. The power strip then updates the table of plugged-devices to show the row for outlet 5, state=OFF, device name="scanner".

The flowchart and block diagrams illustrate the architecture, functionality, and operation of possible implementations of systems, methods and computer program products according to various embodiments of the present invention. In that regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The method, system and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated info a processor or CPU or other larger system integrated circuit or chip. The disclosed methodology may also be implemented solely or partially in program code stored on a computer or a computer program product comprising a computer-readable, tangible storage device(s) and computer-readable program instructions stored on the computer-readable, tangible storage device(s) in any portable or fixed, volatile or non-volatile memory device, including CDs, RAM and "Flash" memory, or other semiconductor, optical, magnetic or other currently available or later developed memory device capable of storing code. The disclosed methodology may also be implemented using any available input and/or display systems including touch-sensitive screens and optically-sensitive input pads. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A machine and/or software-implemented method for enabling and disabling selective power strip connections to peripheral devices plugged into outlets of said power strip, said peripheral devices being selectively usable in conjunction with a master device, said method comprising:

detecting when a peripheral device is connected to any outlet of said power strip, said power strip containing a plurality of outlets arranged to separately enable individual power connections between a power source and each of one or more master devices or peripheral devices, said power strip being designed whereby none of said outlets on said power strip is configured to be connected only to master devices or only to peripheral devices;

identifying each of said peripheral device which is plugged into any outlet of said power strip;

identifying a master device which is plugged into any outlet of said power strip;

identifying corresponding outlets at which said peripheral devices and said master device are plugged into said power strip;

creating a correlation listing of said peripheral devices and said master device, said listing including an identification of each of said peripheral devices and an identification of said master device, said correlation listing further including an identification of said corresponding outlets to which each of said peripheral devices and said master device is connected to said power strip;

automatically detecting, without user input, a mode of operation of said master device, said mode of operation being one of several modes of operation in which said master device may be operating, said master device being operable for using different peripheral devices depending upon said detected mode of operation of said master device; and enabling a power connection at outlets of said power strip only to said master device and only selected peripheral devices which are to be used with said master device as determined by said detected mode of operation of said master device and said corresponding outlets at which said peripheral devices and said master device are plugged into said power strip.

2. The method as set forth in claim 1 and further including saving said correlation listing at said power strip.

3. The method as set forth in claim 2 and further including:
   determining when said master device has been turned on; and
   sending said correlation listing from said power strip to said master device in response to said. determining.

4. The method as set forth in claim 1 and further including disabling power connections at outlets of said power strip to peripheral devices which are not to be used with said master device in said node of operation of said master device.

5. The method as set forth in claim 1 wherein said master device is a computer device.

6. The method as set forth in claim 1 wherein said master device is a television device.

7. The method as set forth in claim 1 wherein said master device is an audio processing device.

8. The method as set forth in claim 1 and further including determining when said master device is turned-off; and
   disconnecting power to said selected peripheral devices upon said determining that said master device is turned off.

9. The method as set forth in claim 1 and further including:
   determining when said master device has changed said mode of operation from a first mode to a second mode; and
   responding to said determined change of mode of operation of said master device by disconnecting power at outlets of said power strip connected to said selected peripheral devices used in said first mode and by connecting power at outlets of said power strip to peripheral devices which are to be used with said master device in said second mode of operation of said master device.

* * * * *